US012604380B2

(12) United States Patent
Luo et al.

(10) Patent No.: US 12,604,380 B2
(45) Date of Patent: Apr. 14, 2026

(54) METHOD AND APPARATUS FOR CALCULATING DUTY CYCLE OF LIGHTING, TERMINAL, AND STORAGE MEDIUM

(71) Applicant: LEEDARSON LIGHTING CO., LTD., Zhangzhou City (CN)

(72) Inventors: Cheng Luo, Zhangzhou City (CN); Hao Chen, Zhangzhou City (CN); Junru Liu, Zhangzhou City (CN); Qiqiang Lin, Zhangzhou City (CN); Xiaobo Chen, Zhangzhou City (CN); Zongyuan Liu, Zhangzhou City (CN)

(73) Assignee: Leedarson Lighting Co., Ltd., Zhangzhou City (CN)

( * ) Notice: Subject to any disclaimer, the term of this patent is extended or adjusted under 35 U.S.C. 154(b) by 149 days.

(21) Appl. No.: 18/776,014

(22) Filed: Jul. 17, 2024

(65) Prior Publication Data

US 2025/0168948 A1 May 22, 2025

(30) Foreign Application Priority Data

Nov. 17, 2023 (CN) ........................ 202311541136.9

(51) Int. Cl.
*H05B 45/24* (2020.01)

(52) U.S. Cl.
CPC .................................... *H05B 45/24* (2020.01)

(58) Field of Classification Search
CPC ........ H05B 45/10; H05B 45/20; H05B 45/24; H05B 47/10; H05B 47/105; H05B 47/155
See application file for complete search history.

(56) References Cited

U.S. PATENT DOCUMENTS

| | | | | |
|---|---|---|---|---|
| 8,390,205 B2 * | 3/2013 | Li | H05B 45/20 | 315/153 |
| 10,517,156 B1 * | 12/2019 | Qiu | H05B 45/325 | |
| 11,076,461 B2 * | 7/2021 | Qiu | H05B 39/083 | |
| 11,672,060 B1 * | 6/2023 | Chen | H05B 45/325 | 315/363 |
| 12,336,070 B2 * | 6/2025 | Saes | H05B 45/38 | |
| 2010/0072901 A1 * | 3/2010 | De Rijck | H05B 45/28 | 315/161 |
| 2010/0123743 A1 * | 5/2010 | Chang | G09G 3/3413 | 315/297 |
| 2012/0049743 A1 * | 3/2012 | Moskowitz | H05B 45/20 | 315/149 |

(Continued)

*Primary Examiner* — Jason M Crawford
(74) *Attorney, Agent, or Firm* — AP3 Law Firm PLLC

(57) ABSTRACT

The present application provides a method and an apparatus for calculating a duty cycle of a lighting, a terminal, and a storage medium. The method includes: determining a first expression formula of a chromaticity coordinate, a luminous flux and an input duty cycle of each path of three paths of a RGB color light source; calibrating, based on the first expression formula and tristimulus values of the three paths of the RGB color light source under a full current operation, a nonlinear transformation of the luminous flux, to obtain a first duty cycle value; and calibrating, based on the first duty cycle value and the first expression formula, a nonlinear transformation of the chromaticity coordinate, to obtain a second duty cycle value; and controlling displaying colors of the RGB color light source based on the second duty cycle value.

10 Claims, 8 Drawing Sheets

(56) References Cited

U.S. PATENT DOCUMENTS

| | | | | |
|---|---|---|---|---|
| 2014/0268734 | A1* | 9/2014 | Chang | H05B 45/40 362/231 |
| 2015/0154762 | A1* | 6/2015 | Yang | G06T 11/10 345/603 |
| 2015/0296589 | A1* | 10/2015 | Melanson | H05B 45/40 315/151 |
| 2017/0202071 | A1* | 7/2017 | Chen | H05B 45/20 |
| 2019/0132919 | A1* | 5/2019 | Frost | H05B 45/20 |
| 2020/0027421 | A1* | 1/2020 | Sun | G09G 3/2003 |
| 2020/0404758 | A1* | 12/2020 | Zeng | H05B 45/325 |
| 2022/0095427 | A1* | 3/2022 | Jiang | H05B 45/20 |
| 2023/0164894 | A1* | 5/2023 | Puscasu | H05B 45/59 315/77 |
| 2024/0284569 | A1* | 8/2024 | Ter Weeme | H05B 45/24 |
| 2024/0292504 | A1* | 8/2024 | Brandl | H05B 45/325 |
| 2025/0168948 | A1* | 5/2025 | Luo | H05B 45/24 |

* cited by examiner determining a second expression formula of the chromaticity coordinate and the luminous flux of a three-path mixed light of the RGB color light source

↓ obtaining a three-channel duty cycle formula based on the second expression formula and a sum of the tristimulus values, the three-channel duty cycle formula representing respective duty cycles of the three paths

↓ obtaining a first influencing parameter, based on the luminous flux under a full duty cycle of the three paths of the RGB color light source and the first duty cycle value to be determined

↓ obtaining the first duty cycle value based on the first influencing parameter, the three-channel duty cycle formula and a luminous flux expression of the first expression formula

Fig. 2

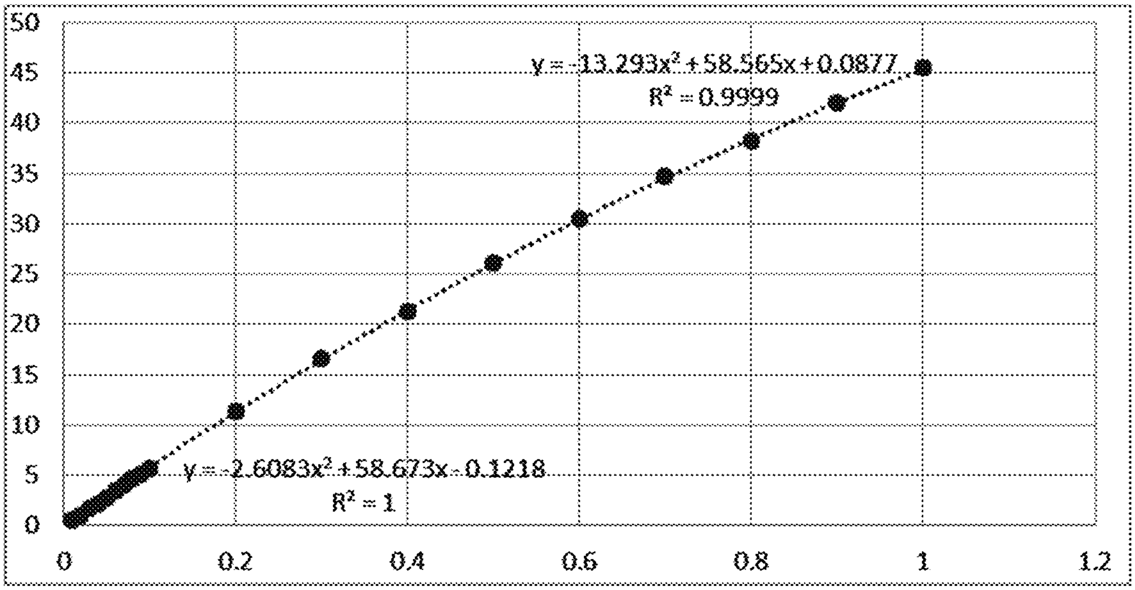

Fig. 3A

METHOD AND APPARATUS FOR CALCULATING DUTY CYCLE OF LIGHTING, TERMINAL, AND STORAGE MEDIUM

CROSS-REFERENCE TO RELATED APPLICATIONS

This application claims priority to Chinese Patent Application No. 202311541136.9, filed on Nov. 17, 2023 and entitled "method and apparatus for calculating duty cycle of lighting, terminal, and storage medium". The disclosure of the aforementioned application is hereby incorporated by reference in its entirety.

TECHNICAL FIELD

The present application relates to the technical field of lighting control, and particularly relates to a method and an apparatus for calculating a duty cycle of a lighting, a terminal, and a storage medium.

BACKGROUND

When different colors of light are mixed together, different duty cycles can present different colors. Therefore, the colored lights decorated on the exterior surface of the building flicker in the night sky, appearing particularly beautiful.

When calculating the duty cycle of existing RGB color mixing, it is generally based on the Grassmann mixing formula. However, the Grassmann mixing formula assumes that the chromaticity values of the RGB three light sources remain constant, and the luminous flux changes linearly with the input current. However, due to the inherent characteristics of RGB color light sources, the output of their optical parameters is relatively unstable, and their optical flux does not vary linearly with the input current signal. The chromaticity value also changes with the change of current. Therefore, the deviation of the duty cycle calculated using the existing Grassmann mixing formula is relatively large.

SUMMARY

These and other problems are generally solved or circumvented, and technical advantages are generally achieved, by embodiments of the present application which provide a method and an apparatus for calculating a duty cycle of a lighting, a terminal, and a storage medium.

Technical Problems

The present application provides a method and an apparatus for calculating a duty cycle of a lighting, a terminal, and a storage medium to solve the problem that the deviation of the duty cycle calculated using the existing Grassmann mixing formula is relatively large.

Technical Solutions

In a first aspect, one embodiment of the present application provides a method for calculating a duty cycle of a lighting, including: determining a first expression formula of a chromaticity coordinate, a luminous flux and an input duty cycle of each path of three paths of a RGB color light source; calibrating, based on the first expression formula and tristimulus values of the three paths of the RGB color light source under a full current operation, a nonlinear transformation of the luminous flux, to obtain a first duty cycle value of the each path of the three paths of the RGB color light source, the first duty cycle value being obtained in consideration of the luminous flux variable with different duty cycle values; calibrating, based on the first duty cycle value and the first expression formula, a nonlinear transformation of the chromaticity coordinate, to obtain a second duty cycle value of the each path of the three paths of the RGB color light source, the second duty cycle value being obtained in consideration of the luminous flux and the chromaticity coordinate variable with the different duty cycle values; and controlling displaying colors of the RGB color light source based on the second duty cycle value.

In one possible implementation, after calibrating, based on the first duty cycle value and the first expression formula, the nonlinear transformation of the chromaticity coordinate, the method further includes: determining, based on the second duty cycle value, a normalized duty cycle as a target duty cycle; and controlling displaying the colors of the RGB color light source based on the target duty cycle.

In one possible implementation, calibrating, based on the first expression formula and the tristimulus values of the three paths of the RGB color light source under the full current operation, the nonlinear transformation of the luminous flux, to obtain the first duty cycle value, includes: determining a second expression formula of the chromaticity coordinate and the luminous flux of a three-path mixed light of the RGB color light source; obtaining a three-channel duty cycle formula based on the second expression formula and a sum of the tristimulus values under the full current operation of the three paths of the RGB color light source, the three-channel duty cycle formula representing respective duty cycles of the three paths; obtaining a first influencing parameter, based on the luminous flux under a full duty cycle of the three paths of the RGB color light source and the first duty cycle value to be determined; and obtaining the first duty cycle value based on the first influencing parameter, the three-channel duty cycle formula and a luminous flux expression of the first expression formula.

In one possible implementation, the second expression formula is $$\begin{cases} Y = \eta_1 Y_1 + \eta_2 Y_2 + \eta_3 Y_3 \\ x = \dfrac{X}{X+Y+Z} = \dfrac{\eta_1 C_1 x_1 + \eta_2 C_2 x_2 + \eta_3 C_3 x_3}{\eta_1 C_1 + \eta_2 C_2 + \eta_3 C_3} \\ y = \dfrac{Y}{X+Y+Z} = \dfrac{\eta_1 C_1 y_1 + \eta_2 C_2 y_2 + \eta_3 C_3 y_3}{\eta_1 C_1 + \eta_2 C_2 + \eta_3 C_3} \end{cases};$$

x and y represent a horizontal coordinate and a vertical coordinate of the chromaticity coordinate of a target color, respectively; X, Y and Z represent three stimulation values of the tristimulus values of the RGB color light source, respectively; $Y_i$ represents the stimulation value Y under a full current operation of an ith path of the three paths of the RGB color light source, and i=(1, 2, 3); the stimulation value Y is equal to the luminous flux Y; $\eta_i$ represents a duty cycle corresponding to the ith path of the three paths of the RGB color light source; $C_i$ represents a sum of the tristimulus values under the full current operation of the ith path of the three paths of the RGB color light source, and $$C_i = \frac{Y_i}{y_i};$$

$x_i$ represents a horizontal coordinate value of the chromaticity coordinate of the ith path of the three paths of the RGB color light source; $y_i$ represents a vertical coordinate value of the chromaticity coordinate of the ith path of the three paths of the RGB color light source. In one possible implementation, the three-channel duty cycle formula is:

$$\begin{cases} \eta_1 = \left[\frac{(y_2-y_3)(x_3-x)+(y-y_3)(x_2-x_3)}{(y_2-y_3)(x_3-x_1)+(y_1-y_3)(x_2-x_3)}\right]\frac{y_1 Y}{y Y_1} \\ \eta_2 = \left[\frac{(y_3-y_1)(x_1-x)+(y-y_1)(x_3-x_1)}{(y_3-y_1)(x_1-x_2)+(y_2-y_1)(x_2-x_1)}\right]\frac{y_2 Y}{y Y_2} \\ \eta_3 = \left[\frac{(y_2-y_1)(x_1-x)+(y-y_1)(x_2-x_1)}{(y_2-y_1)(x_1-x_3)+(y_3-y_1)(x_2-x_1)}\right]\frac{y_3 Y}{y Y_3} \end{cases}.$$

In one possible implementation, obtaining the first influencing parameter, based on the luminous flux under the full duty cycle of the three paths of the RGB color light source and the first duty cycle value to be determined includes: obtaining the first influencing parameter based on $S_i=Y_i*\eta_i'$; $S_i$ represents the first influencing parameter; $Y_i$ represents the stimulation value Y under the full current operation of the ith path of the three paths of the RGB color light source; $\eta_i'$ represents the first cycle value to be determined.

In one possible implementation, obtaining the first duty cycle value based on the first influencing parameter, the three-channel duty cycle formula and the luminous flux expression of the first expression formula, includes: replacing the first influencing parameter with the luminous flux expression of the first expression formula, and substituting the luminous flux expression of the first expression formula into the three-channel duty cycle formula, to obtain a transformed luminous flux expression being:

$$\begin{cases} A_{Y_1}\eta_1'^2 + B_{Y_1}\eta_1' + C_{Y_1} = \left[\frac{(y_2-y_3)(x_3-x)+(y-y_3)(x_2-x_3)}{(y_2-y_3)(x_3-x_1)+(y_1-y_3)(x_2-x_3)}\right]\frac{y_1 Y}{y} \\ A_{Y_2}\eta_2'^2 + B_{Y_2}\eta_2' + C_{Y_2} = \left[\frac{(y_3-y_1)(x_1-x)+(y-y_1)(x_3-x_1)}{(y_3-y_1)(x_1-x_2)+(y_2-y_1)(x_3-x_1)}\right]\frac{y_2 Y}{y} \\ A_{Y_3}\eta_3'^2 + B_{Y_3}\eta_3' + C_{Y_3} = \left[\frac{(y_2-y_1)(x_1-x)+(y-y_1)(x_2-x_1)}{(y_2-y_1)(x_1-x_3)+(y_3-y_1)(x_2-x_1)}\right]\frac{y_3 Y}{y} \end{cases};$$

solving the transformed luminous flux expression to obtain $$\eta_i' = \frac{-B_{Y_i} + \sqrt{B_{Y_i}^2 - 4A_{Y_i}C'_{Y_i}}}{2A_{Y_i}};$$

and taking a positive solution of $\eta_i'$ as the first duty cycle value; $A_{Y_i}$, $B_{Y_i}$, and $C'_{Y_i}$ represent three coefficients of the luminous flux of the ith path in the transformed luminous flux expression, respectively; $C'_{Y_i}$ represents another coefficient of the luminous flux of the ith path in the transformed luminous flux expression.

In one possible implementation, the method further includes performing a segmented fitting treatment of the input duty cycle on the first expression formula; after solving the transformed luminous flux expression to obtain $\eta_i'$, the method further includes: after performing the segmented fitting treatment of the input duty cycle on the first expression formula to obtain a solution $\eta_i'$ corresponding to a low duty cycle and a solution $\eta_i'$ corresponding to a high duty cycle, when a positive solution of the solution $\eta_i'$ corresponding to the low duty cycle is within a preset low duty cycle range, determining the positive solution of the solution $\eta_i'$ corresponding to the low duty cycle as the first duty cycle value; and when a positive solution of the solution $\eta_i'$ corresponding to the high duty cycle is within a preset high duty cycle range, determining the positive solution of the solution $\eta_i'$ corresponding to the high duty cycle as the first duty cycle value.

In one possible implementation, calibrating, based on the first duty cycle value and the first expression formula, the nonlinear transformation of the chromaticity coordinate, to obtain the second duty cycle value, includes: inputting the first duty cycle value into a chromaticity coordinate expression of the first expression formula, to obtain a calibration chromaticity coordinate corresponding to the each path of the RGB color light source under one calibration duty cycle; and inputting the calibration chromaticity coordinate into the transformed luminous flux expression, to obtain the second duty cycle value.

In one possible implementation, determining, based on the second duty cycle value, the normalized duty cycle as the target duty cycle, includes: determining three luminous fluxes under the full duty cycle of the three paths of the RGB color light source, based on the first expression formula; determining a maximum duty cycle of three second duty cycle values corresponding to the three paths of the RGB color light source; determining a normalized luminous flux, based on the maximum duty cycle and the luminous flux of one path corresponding to the maximum duty cycle under the full duty cycle; and inputting the normalized luminous flux into the transformed luminous flux expression, and solving the transformed luminous flux expression, to obtain the target duty cycle.

In a second aspect, one embodiment of the present application provides an apparatus for calculating a duty cycle of a lighting, including: a determining module, being configured to determine a first expression formula of a chromaticity coordinate, a luminous flux and an input duty cycle of a first path of three paths of a RGB color light source; and a calibrating module, being configured to calibrate, based on the first expression formula and tristimulus values of the three paths of the RGB color light source under a full current operation, a nonlinear transformation of the luminous flux, to obtain a first duty cycle value of the first path of the three paths of the RGB color light source, the first duty cycle value being obtained in consideration of the luminous flux variable with different duty cycle values; the calibrating module further is configured to calibrate, based on the first duty cycle value and the first expression formula, a nonlinear transformation of the chromaticity coordinate, to obtain a second duty cycle value of the first path of the three paths of the RGB color light source, the second duty cycle value being obtained in consideration of the luminous flux and the chromaticity coordinate variable with the different duty cycle values; and control displaying colors of the RGB color light source based on the second duty cycle value.

In a third aspect, an embodiment of the present application provides an apparatus for calculating a duty cycle of a lighting, including: a non-transitory memory storing a computer program; and one or more processors in communication with the memory, where the computer program when executed by the one or more processors, causes the apparatus to perform the method as described in the first aspect or any possible implementation of the first aspect.

In a fourth aspect, an embodiment of the present application provides a terminal including a non-transitory memory and a processor, where the memory is configured to store a computer program, and the processor is configured to execute the computer program stored in the memory to perform the method as described in the first aspect or any possible implementation of the first aspect.

In a fifth aspect, an embodiment of the present application provides a non-transitory computer-readable storage medium, the non-transitory computer-readable storage medium storing a computer program, where the computer program, when executed by a processor, causes the processor to perform the method as described in the first aspect or any possible implementation of the first aspect.

Advantageous Effects of the Disclosure

Embodiments of the present application provides a method and an apparatus for calculating a duty cycle of a lighting, a terminal, and a storage medium. By determining a first expression formula of a chromaticity coordinate, a luminous flux and an input duty cycle of a first path of three paths of a RGB color light source; calibrating, based on the first expression formula and tristimulus values of the three paths of the RGB color light source under a full current operation, a nonlinear transformation of the luminous flux, to obtain a first duty cycle value of the first path of the three paths of the RGB color light source, the first duty cycle value being obtained in consideration of the luminous flux variable with different duty cycle values; calibrating, based on the first duty cycle value and the first expression formula, a nonlinear transformation of the chromaticity coordinate, to obtain a second duty cycle value of the first path of the three paths of the RGB color light source, the second duty cycle value being obtained in consideration of the luminous flux and the chromaticity coordinate variable with the different duty cycle values; and controlling displaying colors of the RGB color light source based on the second duty cycle; which enables calibration calculation of the nonlinear transformation of the chromaticity coordinate and the luminous flux, effectively increases the accuracy of the color calculation, and the calculation method is simple and solves the problem of large duty cycle deviation caused by calculating the duty cycle of color mixed light based on the principle of linear transformation in prior art.

BRIEF DESCRIPTION OF THE DRAWINGS

In order to provide a clearer explanation of the technical solution in the embodiments of the present application, a brief introduction will be given below to the drawings required in the embodiments or prior art descriptions. It is evident that the drawings in the following description are only some embodiments of the present application. For those skilled in the art, other drawings can be obtained based on these drawings without creative labor.

FIG. 2 is an implementation flowchart of a method for calculating a first duty cycle value of a luminous flux changing with a duty cycle provided by one embodiment of the present application;

FIG. 3A is a schematic diagram of a luminous flux changing with a duty cycle in a channel R provided by one embodiment of the present application;

DETAILED DESCRIPTION OF ILLUSTRATIVE EMBODIMENTS

In the following description, specific details such as specific system structures, techniques, etc. are proposed for the purpose of illustration rather than limitation, in order to thoroughly understand the embodiments of the present application. However, those skilled in the art should be aware that the present application can also be implemented in other embodiments without these specific details. In other cases, detailed descriptions of well-known systems, devices, circuits, and methods are omitted to avoid unnecessary details hindering the description of the present application.

In order to clarify the purpose, technical solution, and advantages of the present application, specific embodiments will be provided below in conjunction with the drawings.

In the prior art, based on the Grassman mixing formula, when calculating the duty cycle of color mixing, it is assumed that the chromaticity values of the RGB three light sources remain constant and the luminous flux changes linearly with the input current. However, in reality, the output of optical parameters is relatively unstable, and their optical flux does not vary linearly with the input current signal. The chromaticity value also changes with the change of current. Therefore, it is necessary to design a method that takes into account this nonlinear change and is convenient for calculation to accurately predict the duty cycle of RGB color mixing.

Figure 1:
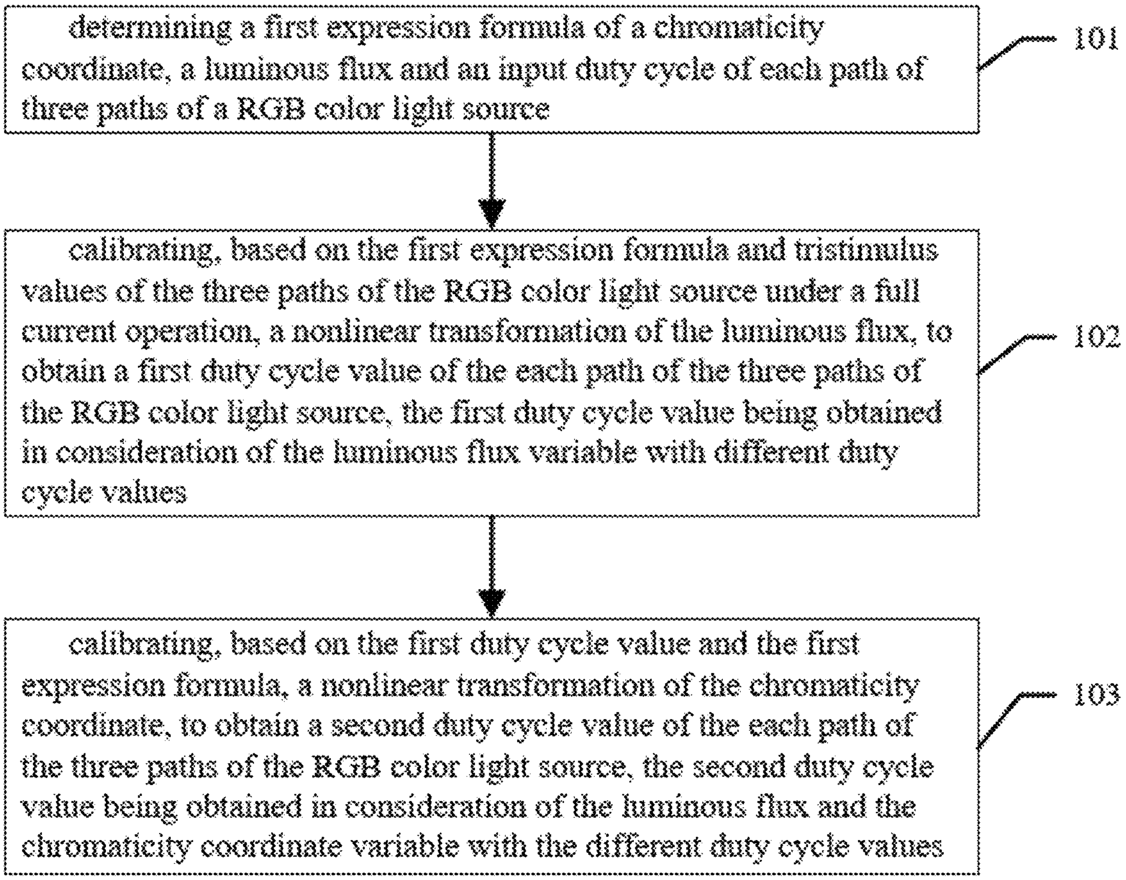
FIG. 1 is an implementation flowchart of a method for calculating a duty cycle of a lighting provided by one embodiment of the present application.

FIG. 1 is an implementation flowchart of a method for calculating a duty cycle of a lighting provided in the embodiment of the present application. The duty cycle of the lighting is obtained by performing primary calibration based on the luminous flux and secondary calibration based on the chromaticity coordinate. The method for calculating the duty cycle of the lighting is detailed as follows.

Step 101, determining a first expression formula of a chromaticity coordinate, a luminous flux and an input duty cycle of each path of three paths of a RGB color light source.

The first expression formula for the chromaticity coordinate and the luminous flux that vary with the input duty cycle of each path of the RGB color light source is:

$$\begin{cases} x = A_x\eta^2 + B_x\eta + C_x \\ y = A_y\eta^2 + B_y\eta + C_y \\ Y = A_Y\eta^2 + B_Y\eta + C_Y \end{cases}.$$

In the first expression formula, x and y are chromaticity coordinates of each path of three paths of the RGB color light source; Y is the luminous flux of each path of the three paths of the RGB color light source; and $\eta$ is the input duty cycle of each path of the three paths of the RGB color light source. $A_j$, $B_j$, and $C_j$ are coefficients, where j=(x, y, Y), and these coefficients may be obtained through numerical fitting of the measured chromaticity coordinate data of the RGB color light source and the measured luminous flux data of the RGB color light source varying with the current.

Figure 7:
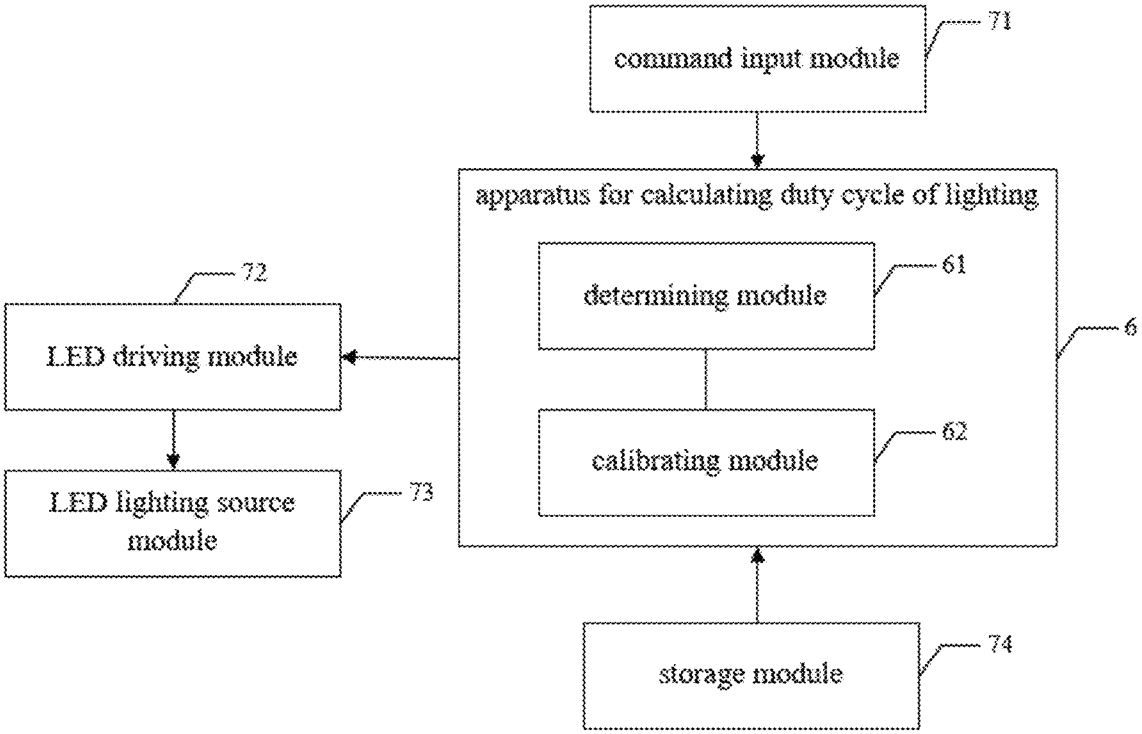
FIG. 7 is a schematic diagram of a system for calculating a duty cycle of a lighting provided by one embodiment of the present application.

It is apparent to those of ordinary skill in the art that the first expression formula mentioned above is set in the storage module of the lighting device, and the calculation module performs the operation. The calculation module extracts the first expression formula from the storage module for subsequent calculations to use. The relationship between the storage module and the computing module is shown in FIG. 7. In addition, the RGB color light source includes an R light source, a G light source, and a B light source, forming three light sources. It is apparent to those of ordinary skill in the art that x and y are the CIE 1931 xyY spatial color coordinate of the target color, Y is the luminous flux of the target color; $x_i$ and $y_i$ are the CIE 1931 xyY spatial color coordinate of one of the three paths, and $Y_i$ is the luminous flux of one of the three paths. X, Y and Z are the CIE 1931 XYZ spatial color coordinates of the target color. X, Y and Z, also known as tristimulus values. The tristimulus values include a stimulus level of red primary color X, a stimulus level of green primary color Y, and a stimulus level of blue primary color Z, where the stimulus value Y is equal to the luminous flux Y.

Step 102, calibrating, based on the first expression formula and tristimulus values of the three paths of the RGB color light source under a full current operation, a nonlinear transformation of the luminous flux, to obtain a first duty cycle value of the each path of the three paths of the RGB color light source, the first duty cycle value being obtained in consideration of the luminous flux variable with different duty cycle values.

Due to the relatively unstable output of the optical parameters of the RGB color light source, the luminous flux does not vary linearly with the input current signal. Therefore, in one embodiment, considering the non-linear variation of the luminous flux with duty cycle, the duty cycle in the first expression formula is corrected. In the process of the non-linear transformation of the luminous flux, due to the significant impact of the luminous flux on the duty cycle, formula conversion is used to eliminate the calculation influence of the luminous flux.

It should be noted that the present application obtains three duty cycles of the three paths of RGB color light source. According to the principle of additive mixing, the three primary colors (RGB) can be mixed into any color. When the accurate three duty cycles corresponding to a certain target color are obtained, the color displayed by the RGB color light source mixing can be accurately controlled.

For example, the RGB color light source includes an R light source, a G light source, and a B light source. When these three lights emit light at the same time, their light will overlap to form a new color. By adjusting the brightness of each light, the proportion of the three colors can be controlled, resulting in different colors of the RGB color light source. The brightness of the each light is adjusted by controlling the on/off time of the current. The longer the on/off time, the higher the brightness, and the shorter the on/off time, the lower the brightness. The relationship between the on/off time and the cycle is the duty cycle. Therefore, different brightness can be adjusted through different duty cycles to control the color of the RGB color light source.

Optionally, in one embodiment, as shown in FIG. 2, calibrating, based on the first expression formula and the tristimulus values of the three paths of the RGB color light source under the full current operation, the nonlinear transformation of the luminous flux, to obtain the first duty cycle value, may include: determining a second expression formula of the chromaticity coordinate and the luminous flux of a three-path mixed light of the RGB color light source; obtaining a three-channel duty cycle formula based on the second expression formula and a sum of the tristimulus values, the three-channel duty cycle formula representing respective duty cycles of the three paths; obtaining a first influencing parameter, based on the luminous flux under a full duty cycle of the three paths of the RGB color light source and the first duty cycle value to be determined; and obtaining the first duty cycle value based on the first influencing parameter, the three-channel duty cycle formula and a luminous flux expression of the first expression formula.

Where, the second expression formula is a formula of the chromaticity coordinate and the luminous flux of the target duty cycle obtained based on the Grassman three paths mixing formula. The second expression formula is:

$$\begin{cases} Y = \eta_1 Y_1 + \eta_2 Y_2 + \eta_3 Y_3 \\ x = \dfrac{X}{X+Y+Z} = \dfrac{\eta_1 C_1 x_1 + \eta_2 C_2 x_2 + \eta_3 C_3 x_3}{\eta_1 C_1 + \eta_2 C_2 + \eta_3 C_3} \\ y = \dfrac{Y}{X+Y+Z} = \dfrac{\eta_1 C_1 y_1 + \eta_2 C_2 y_2 + \eta_3 C_3 y_3}{\eta_1 C_1 + \eta_2 C_2 + \eta_3 C_3} \end{cases}.$$

Where, x and y represent a horizontal coordinate and a vertical coordinate of the chromaticity coordinate of a target color, respectively; X, Y and Z represent three stimulation values of the tristimulus values of the RGB color light source, respectively; $Y_i$ represents a stimulation value Y under a full current operation of an ith path of the three paths of the RGB color light source, and i=(1, 2,3); the stimulation value Y is equal to the luminous flux Y; $\eta_i$ represents a duty cycle corresponding to the ith path of three paths of the RGB color light source; $C_i$ represents a sum of the tristimulus values under the full current operation of the ith path of the three paths of the RGB color light source, and $$C_i = \frac{Y_i}{y_i};$$

$x_i$ represents a horizontal coordinate value of the chromaticity coordinate of the ith path of the three paths of the RGB color light source; $y_i$ represents a vertical coordinate value of the chromaticity coordinate of the ith path of the three paths of the RGB color light source.

Based on the second expression formula mentioned above, the Glassman mixing formula for the duty cycle of the three-channel may be derived by reverse inference:

$$\begin{cases} \eta_1 = \left[\dfrac{(y_2-y_3)(x_3-x)+(y-y_3)(x_2-x_3)}{(y_2-y_3)(x_3-x_1)+(y_1-y_3)(x_2-x_3)}\right]\dfrac{y_1 Y}{yY_1} \\ \eta_2 = \left[\dfrac{(y_3-y_1)(x_1-x)+(y-y_1)(x_3-x_1)}{(y_3-y_1)(x_1-x_2)+(y_2-y_1)(x_3-x_1)}\right]\dfrac{y_2 Y}{yY_2} \\ \eta_3 = \left[\dfrac{(y_2-y_1)(x_1-x)+(y-y_1)(x_2-x_1)}{(y_2-y_1)(x_1-x_3)+(y_3-y_1)(x_2-x_1)}\right]\dfrac{y_3 Y}{yY_3} \end{cases}.$$

Although the chromaticity coordinate and the luminous flux of the three light sources of the RGB color light source vary nonlinearly with respect to the duty cycle, the luminous flux has a greater impact on the calculation of the mixed light duty cycle compared to the two. Therefore, in this embodiment, the influence of the luminous flux is first considered, and the first influencing parameter is replaced with the luminous flux expression in the first expression formula mentioned above. The first influencing parameter here is calculated based on the luminous flux under the full duty cycle of three paths of the RGB color light source and the first duty cycle value to be determined, that is, the first influencing parameter is obtained based on $S_i=Y_i*\eta_i'$. $S_i$ is not a known value, but an unknown parameter related to known $Y_i$ and unknown $\eta_i'$, and $S_i$ is replaced by the luminous flux expression of the first expression formula during calculation as follows. As an example, by multiplying the left side and the right side of the three-channel duty cycle formula by $Y_i$, the left side of the three-channel duty cycle formula becomes $Y_i*\eta_i'$, which is equal to $S_i$. Then $Y_i*\eta_i'$, i.e., $S_i$, is replaced by the luminous flux expression of the first expression formula.

Where, $S_i$ represents the first influencing parameter; $Y_i$ represents the stimulation value Y under the full current operation of the ith path of the three paths of the RGB color light source; $\eta_i'$ represents the first cycle value to be determined.

In one embodiment, obtaining the first influencing parameter, based on the luminous flux under the full duty cycle of the three paths of the RGB color light source and the first duty cycle value to be determined may include: replacing $S_i=Y_i*\eta_i'$ with the luminous flux expression of the first expression formula, and substituting the luminous flux expression of the first expression formula into the three-channel duty cycle formula, to obtain a transformed luminous flux expression being $$\begin{cases} A_{Y_1}\eta_1'^2 + B_{Y_1}\eta_1' + C_{Y_1} = \left[\dfrac{(y_2-y_3)(x_3-x)+(y-y_3)(x_2-x_3)}{(y_2-y_3)(x_3-x_1)+(y_1-y_3)(x_2-x_3)}\right]\dfrac{y_1 Y}{y} \\ A_{Y_2}\eta_2'^2 + B_{Y_2}\eta_2' + C_{Y_2} = \left[\dfrac{(y_3-y_1)(x_1-x)+(y-y_1)(x_3-x_1)}{(y_3-y_1)(x_1-x_2)+(y_2-y_1)(x_3-x_1)}\right]\dfrac{y_2 Y}{y} \\ A_{Y_3}\eta_3'^2 + B_{Y_3}\eta_3' + C_{Y_3} = \left[\dfrac{(y_2-y_1)(x_1-x)+(y-y_1)(x_2-x_1)}{(y_2-y_1)(x_1-x_3)+(y_3-y_1)(x_2-x_1)}\right]\dfrac{y_3 Y}{y} \end{cases}.$$

In the transformed luminous flux expression, the left side of the equal sign represents the luminous flux of the RGB three channels required for synthesizing the target color point at the corresponding duty cycle, and the right side of the equal sign represents the luminous flux required for mixing. It should be noted that $x_i$, $y_i$, x, y and Y are known quantities.

When solving the transformed luminous flux expression, we first simplify it. Due to the known quantities on the right side, the transformed luminous flux expression may be simplified to obtain:

$$\begin{cases} A_{Y_1}\eta_1'^2 + B_{Y_1}\eta_1' + C'_{Y_1} = 0 \\ A_{Y_2}\eta_2'^2 + B_{Y_2}\eta_2' + C'_{Y_2} = 0 \\ A_{Y_3}\eta_3'^2 + B_{Y_3}\eta_3' + C'_{Y_3} = 0 \end{cases}.$$

By solving the simplified luminous flux expression, i.e. solving the one-dimensional quadratic equation regarding the duty cycle mentioned above, the duty cycle value of the RGB three channels considering the nonlinear variation of the luminous flux with duty cycle may be obtained.

In one embodiment, solving the transformed luminous flux expression to obtain $$\eta_i' = \frac{-B_{Y_i} + \sqrt{B_{Y_i}^2 - 4A_{Y_i}C'_{Y_i}}}{2A_{Yi}};$$

where $A_{Y_i}$, $B_{Y_i}$, and $C_{Y_i}$ represent three coefficients of the luminous flux of the ith path in the luminous flux expression, respectively; $C'_{Y_i}$ represents another coefficient of the luminous flux of the ith path in the luminous flux expression.

The above quadratic equation has two solutions, one positive and one negative. According to the actual meaning of the duty cycle, only the positive solution is in the (0,1) interval. Therefore, the positive solution is the solution to the quadratic equation, which is the duty cycle value we calculated considering the nonlinear variation of the luminous flux with the duty cycle.

It is apparent to those of ordinary skill in the art that there are many influencing factors on the quantum conversion characteristics of LED devices, which result in a greater degree of chromaticity coordinate and luminous flux variation of LED under low duty cycle input compared to high duty cycle input. Therefore, it is necessary to fit the calculation formula in stages according to the height of duty cycle.

In the specific segmentation process, the range of (0, a) is the low duty cycle interval, and the range of (a, 100%) is the high duty cycle interval. a is the critical value, and the value of the critical value may be determined based on the specific characteristics of the LED device. For example, when the linearity of the (20%, 100%) range is 0.1, and the linearity of the (10%, 100%) range is 0.2, the (0, 20%) range may be divided into low duty cycle interval and the (20%, 100%) range may be divided into high duty cycle interval.

For example, the formula for calculating linearity is as follows:

$$\phi = \frac{\Delta Y_{max}}{Y_{100\%}}.$$

Where, $\Delta Y_{max}$ is a maximum deviation luminous flux between the fitted lines, and $Y_{100\%}$ is a luminous flux output at the full duty cycle corresponding to the three paths of the RGB color light source.

Optionally, in this embodiment, the (0, 10%) range may be used as the low duty cycle interval, and the (10%, 100%) range may be used as the high duty cycle interval.

In one embodiment, due to segmented fitting processing, solution corresponding to high duty cycle and solution corresponding to low duty cycle will be obtained, which are two duty cycle values. Therefore, after solving the transformed luminous flux expression to obtain $\eta_i'$, the method further includes: after performing a segmented fitting treatment of the duty cycle to obtain a solution $\eta_i'$ corresponding to a low duty cycle and a solution $\eta_i'$ corresponding to a high duty cycle, when a positive solution of the solution $\eta_i'$ corresponding to the low duty cycle is within a preset low duty cycle range, determining the positive solution of the solution $\eta_i'$ corresponding to the low duty cycle as the first duty cycle value; when a positive solution of the solution $\eta_i'$ corresponding to the high duty cycle is within a preset high duty cycle range, determining the positive solution of the solution $\eta_i'$ corresponding to the high duty cycle as the first duty cycle value.

The preset low duty cycle range and the preset high duty cycle range are pre-set here. For example, the (0, 10%) range may be used as the low duty cycle range, and the (10%, 100%) range may be used as the high duty cycle range. That is to say, when calculating the first duty cycle value of each path, due to the segmented fitting treatment, a solution $\eta_i'$ corresponding to the high duty cycle and a solution $\eta_i'$ corresponding to the low duty cycle will be obtained, and the solution $\eta_i'$ corresponding to the high duty cycle and the solution $\eta_i'$ corresponding to the low duty cycle both include a positive solution and a negative solution.

Step 103, calibrating, based on the first duty cycle value and the first expression formula, a nonlinear transformation of the chromaticity coordinate, to obtain a second duty cycle value of the each path of the three paths of the RGB color light source, the second duty cycle value being obtained in consideration of the luminous flux and the chromaticity coordinate variable with the different duty cycle values.

On the basis of obtaining the first duty cycle value mentioned above, considering the non-linear variation of the chromaticity coordinate with the duty cycle, the duty cycle value is re-calibrated. The obtained second duty cycle value is the duty cycle that comprehensively considers the non-linear variation of the chromaticity coordinate and the luminous flux with the duty cycle. As the influence of the luminous flux is considered in determining the duty cycle, the first duty cycle value has a certain degree of accuracy, which is higher than that calculated using the conventional. Therefore, by using the first duty cycle value with the certain degree of accuracy to calculate the chromaticity coordinate, and then using the chromaticity coordinate to calculate the second duty cycle value, the accuracy of the second duty cycle can be further improved compared with the first duty cycle.

In one embodiment, calibrating, based on the first duty cycle value and the first expression formula, the nonlinear transformation of the chromaticity coordinate, to obtain the second duty cycle value, may include: inputting the first duty cycle value into a chromaticity coordinate expression of the first expression formula, to obtain a calibration chromaticity coordinate corresponding to the each path of the RGB color light source under one calibration duty cycle; and inputting the calibration chromaticity coordinate into the transformed luminous flux expression, to obtain the second duty cycle value, the second duty cycle value being obtained in consideration of the luminous flux and the chromaticity coordinate variable with the different duty cycle values.

Optionally, the calibration chromaticity coordinate corresponding to the three paths of the RGB color light source under one calibration duty cycle obtained may be $$\begin{cases} x' = A_x\eta'^2 + B_x\eta' + C_x \\ y' = A_y\eta'^2 + B_y\eta' + C_y \end{cases}.$$

Input the obtained calibration chromaticity coordinate into the transformed luminous flux expression to obtain $$\begin{cases} A_{Y_1}\eta_1''^2 + B_{Y_1}\eta_1'' + C_{Y_1} = \left[\frac{(y_2'-y_3')(x_3'-x)+(y-y_3')(x_2'-x_3')}{(y_2'-y_3')(x_3'-x_1')+(y_1'-y_3')(x_2'-x_3')}\right]\frac{y_1'Y}{y} \\ A_{Y_2}\eta_2''^2 + B_{Y_2}\eta_2'' + C_{Y_2} = \left[\frac{(y_3'-y_1')(x_1'-x)+(y-y_1')(x_3'-x_1')}{(y_3'-y_1')(x_1'-x_2')+(y_2'-y_1')(x_3'-x_1')}\right]\frac{y_2'Y}{y} \\ A_{Y_3}\eta_3''^2 + B_{Y_3}\eta_3'' + C_{Y_3} = \left[\frac{(y_2'-y_1')(x_1'-x)+(y-y_1')(x_2'-x_1')}{(y_2'-y_1')(x_1'-x_3')+(y_3'-y_1')(x_2'-x_1')}\right]\frac{y_3'Y}{y} \end{cases}.$$

Simplify the above formula and solve to obtain the corresponding second duty cycle value $\eta_i''$ of the luminous flux and the chromaticity coordinate that change with the duty cycle.

In one embodiment, in order to make the calculated second duty cycle value more accurate, it may be normalized.

After calibrating, based on the first duty cycle value and the first expression formula, the nonlinear transformation of the chromaticity coordinate, to obtain the second duty cycle value, the method further may include: determining, based on the second duty cycle value, a normalized duty cycle as a target duty cycle; and controlling displaying the colors of the RGB color light source based on the target duty cycle.

Optionally, determining the normalized duty cycle, based on the second duty cycle value, as the target duty cycle, may include: determining three luminous fluxes under the full duty cycle of the three paths of the RGB color light source, based on the first expression formula; determining a maximum duty cycle of three second duty cycle values corresponding to the three paths of the RGB color light source; determining a normalized luminous flux, based on the maximum duty cycle and the luminous flux of one path corresponding to the maximum duty cycle under the full duty cycle; and inputting the normalized luminous flux into the transformed luminous flux expression, and solving the transformed luminous flux expression, to obtain the target duty cycle.

The full duty cycle is 100% duty cycle, and the luminous flux of the three paths of the RGB color light source at full duty cycle may be expressed as $Y_{100\%}=A_Y+B_Y+C_Y$, where $Y_{100\%}$ represents the luminous flux at full duty cycle.

Based on three second duty cycle values calculated above, determine the maximum duty cycle as $\eta_{max_o}$.

Determine the normalized luminous flux based on $$Y_{nor} = \begin{cases} \dfrac{Y_{100\%\ first\ path}}{\left\{\left[\frac{(y_2-y_3)(x_3-x)+(y-y_3)(x_2-x_3)}{(y_2-y_3)(x_3-x_1)+(y_1-y_3)(x_2-x_3)}\right]\frac{y_1}{y}\right\}} \\ \dfrac{Y_{100\%\ second\ path}}{\left\{\left[\frac{(y_3-y_1)(x_1-x)+(y-y_1)(x_3-x_1)}{(y_3-y_1)(x_1-x_2)+(y_2-y_1)(x_3-x_1)}\right]\frac{y_2}{y}\right\}} \\ \dfrac{Y_{100\%\ third\ path}}{\left\{\left[\frac{(y_2-y_1)(x_1-x)+(y-y_1)(x_2-x_1)}{(y_2-y_1)(x_1-x_3)+(y_3-y_1)(x_2-x_1)}\right]\frac{y_3}{y}\right\}} \end{cases};$$

that is to say, substituting the luminous flux corresponding to the maximum duty cycle $\eta_{max_o}$ into the formula to obtain the normalized luminous flux $Y_{nor}$.

Where, $Y_{nor}$ represents the normalized luminous flux, while $Y_{100\%\ first\ path}$, $Y_{100\%\ second\ path}$, and $Y_{100\%\ third\ path}$ represent the first path, the second path, and the third path luminous fluxes at full duty cycle, respectively.

Inputting the normalized luminous flux into the transformed luminous flux expression to obtain $$\begin{cases} A_{Y_1}\eta_1'^2 + B_{Y_1}\eta_1' + C_{Y_1} = \left[\frac{(y_2-y_3)(x_3-x)+(y-y_3)(x_2-x_3)}{(y_2-y_3)(x_3-x_1)+(y_1-y_3)(x_2-x_3)}\right]\frac{y_1 Y_{nor}}{y} \\ A_{Y_2}\eta_2'^2 + B_{Y_2}\eta_2' + C_{Y_2} = \left[\frac{(y_3-y_1)(x_1-x)+(y-y_1)(x_3-x_1)}{(y_3-y_1)(x_1-x_2)+(y_2-y_1)(x_3-x_1)}\right]\frac{y_2 Y_{nor}}{y} \\ A_{Y_3}\eta_3'^2 + B_{Y_3}\eta_3' + C_{Y_3} = \left[\frac{(y_2-y_1)(x_1-x)+(y-y_1)(x_2-x_1)}{(y_2-y_1)(x_1-x_3)+(y_3-y_1)(x_2-x_1)}\right]\frac{y_3 Y_{nor}}{y} \end{cases}.$$

By solving, the normalized duty cycles of the three paths of the RGB color light source may be obtained, which is the target duty cycle. There is a duty cycle combination in the RGB color light source that reaches the full duty cycle output; and the duty cycle combination (the target duty cycle) includes a first path duty cycle, a second path duty cycle and a third path duty cycle. Based on this duty cycle combination, the display color of the RGB color light source can be precisely controlled.

For example, the colored lights decorated on the exterior surface of a building adopt the calculation method of the present application. Firstly, the first duty cycle value is calculated, then the second duty cycle value is calculated, and finally the target duty cycle is calculated. Based on the target duty cycle, the color displayed by the colored lights can be controlled. In addition, it can also be applied to indoor lighting, bar lighting, performance venue lighting, etc.

Figure 3B:
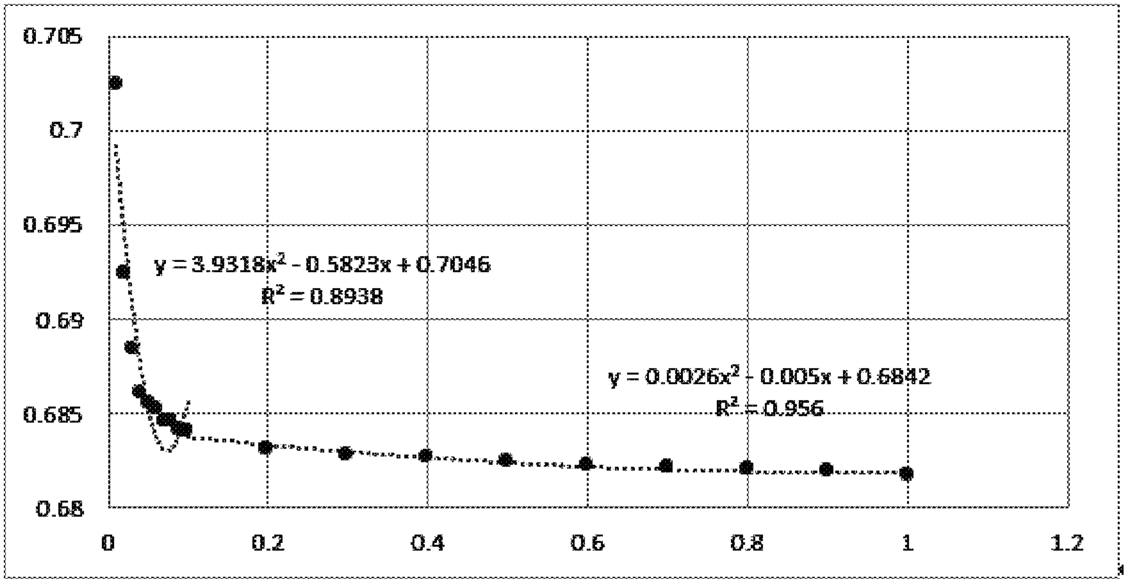
FIG. 3B is a schematic diagram of an x coordinate changing with a duty cycle in a chromaticity coordinate of a channel R provided by one embodiment of the present application.
Figure 3C:
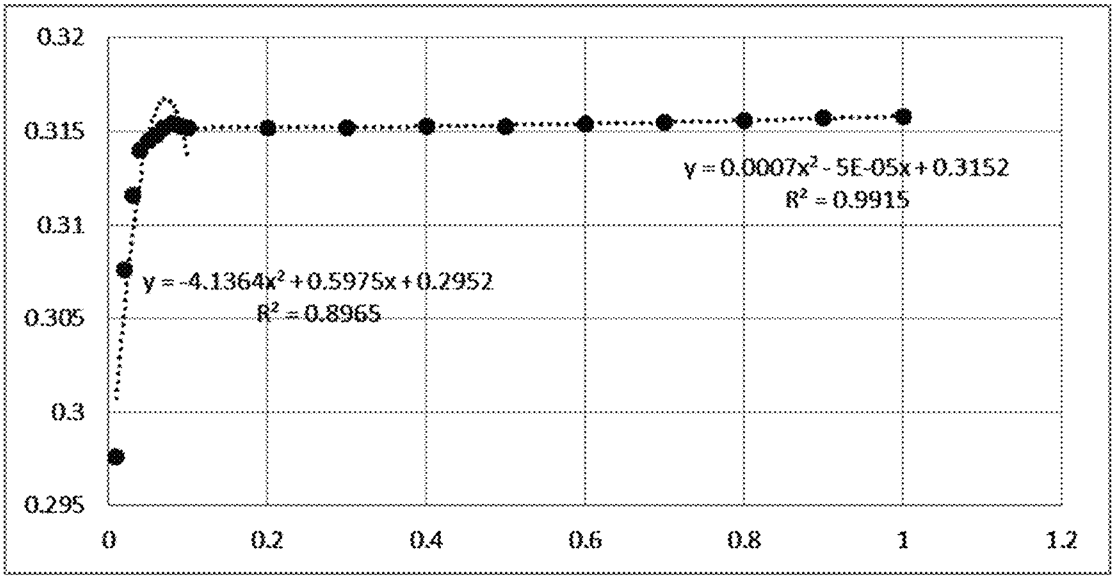
FIG. 3C is a schematic diagram of y coordinate changing with a duty cycle in a chromaticity coordinate of a channel R provided by one embodiment of the present application.
Figure 4A:
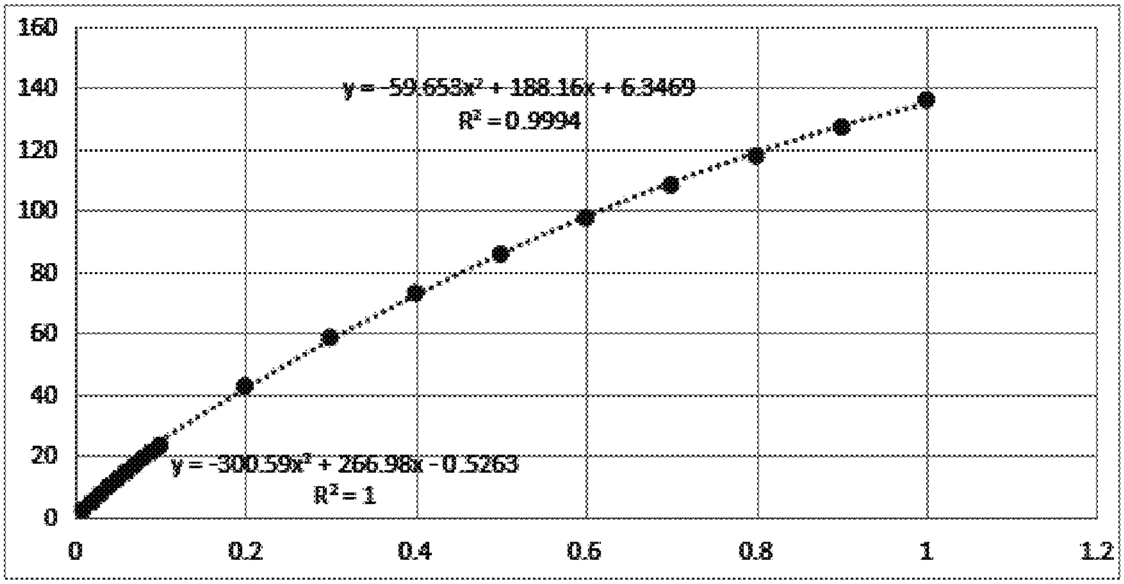
FIG. 4A is a schematic diagram of a luminous flux changing with a duty cycle in a channel G provided by one embodiment of the present application.
Figure 4B:
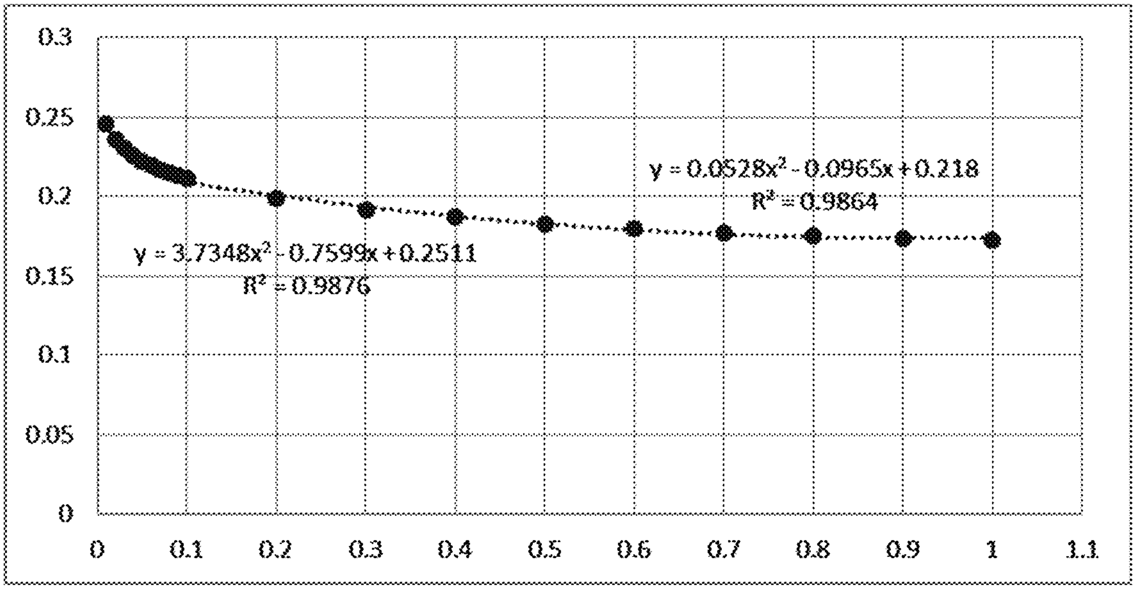
FIG. 4B is a schematic diagram of an x coordinate changing with a duty cycle in a chromaticity coordinate of a channel G provided by one embodiment of the present application.
Figure 4C:
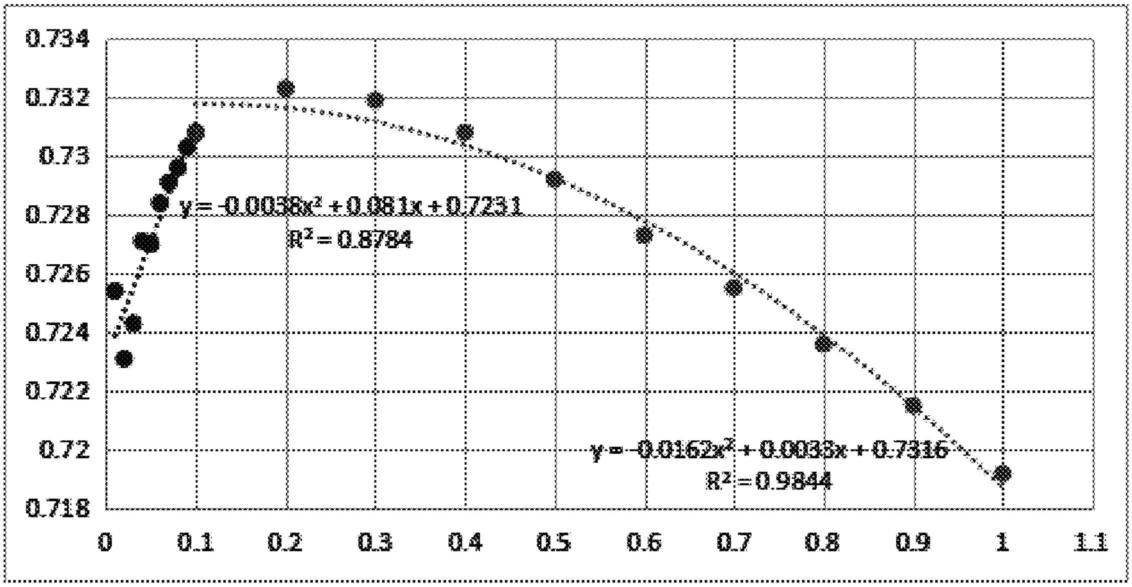
FIG. 4C is a schematic diagram of a y coordinate changing with a duty cycle in a chromaticity coordinate of a channel G provided by one embodiment of the present application.
Figure 5A:
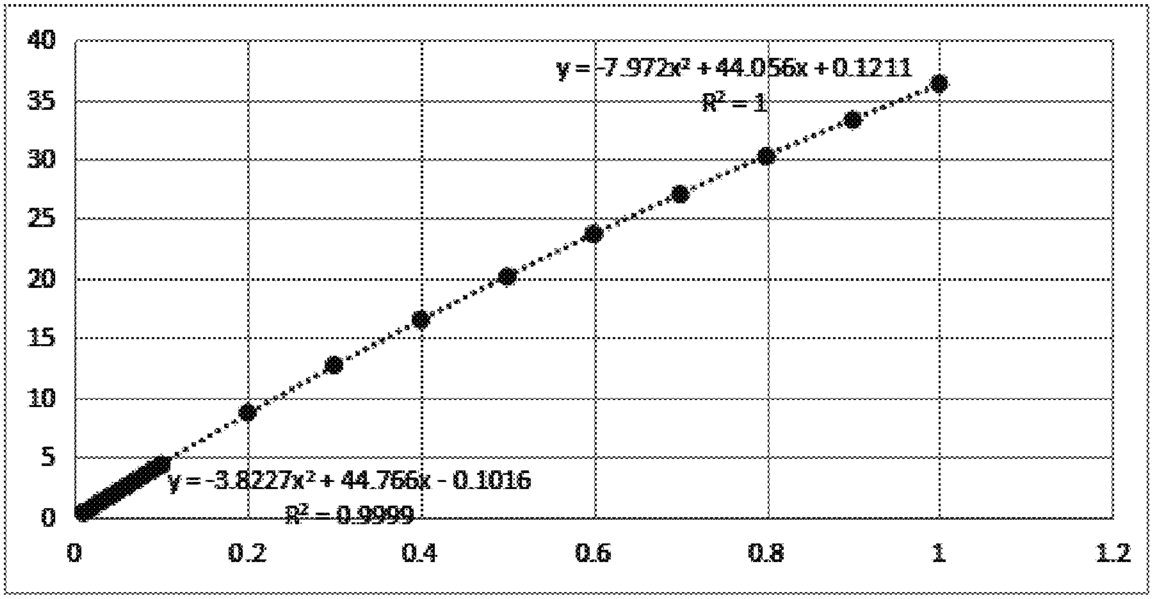
FIG. 5A is a schematic diagram of a luminous flux changing with a duty cycle in a channel B provided by one embodiment of the present application.
Figure 5B:
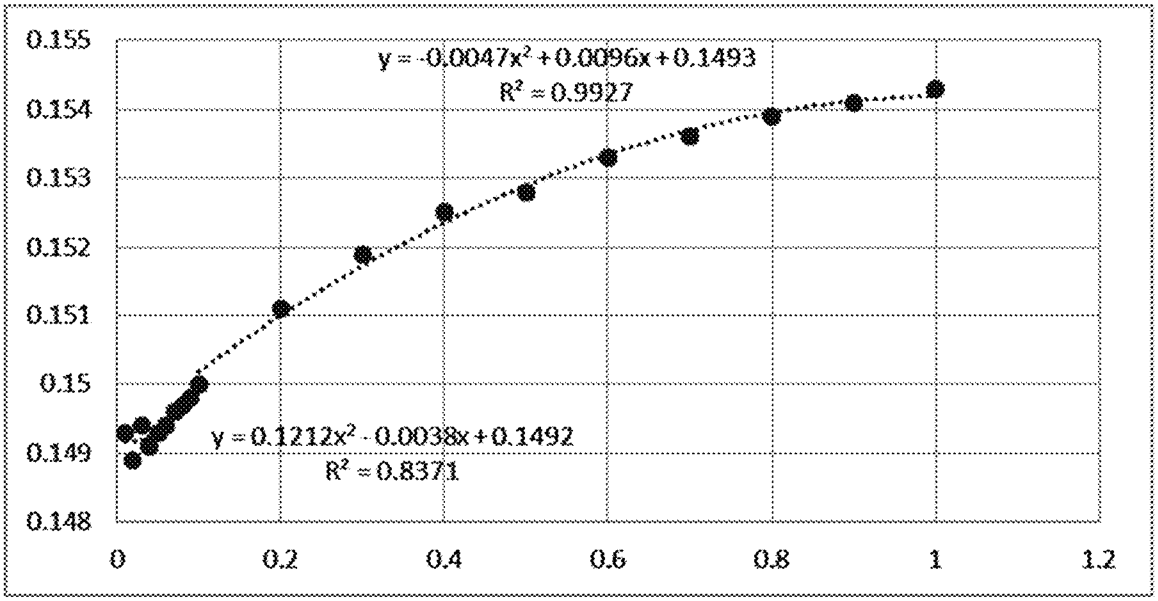
FIG. 5B is a schematic diagram of an x coordinate changing with a duty cycle in a chromaticity coordinate of a channel B provided by one embodiment of the present application.
Figure 5C:
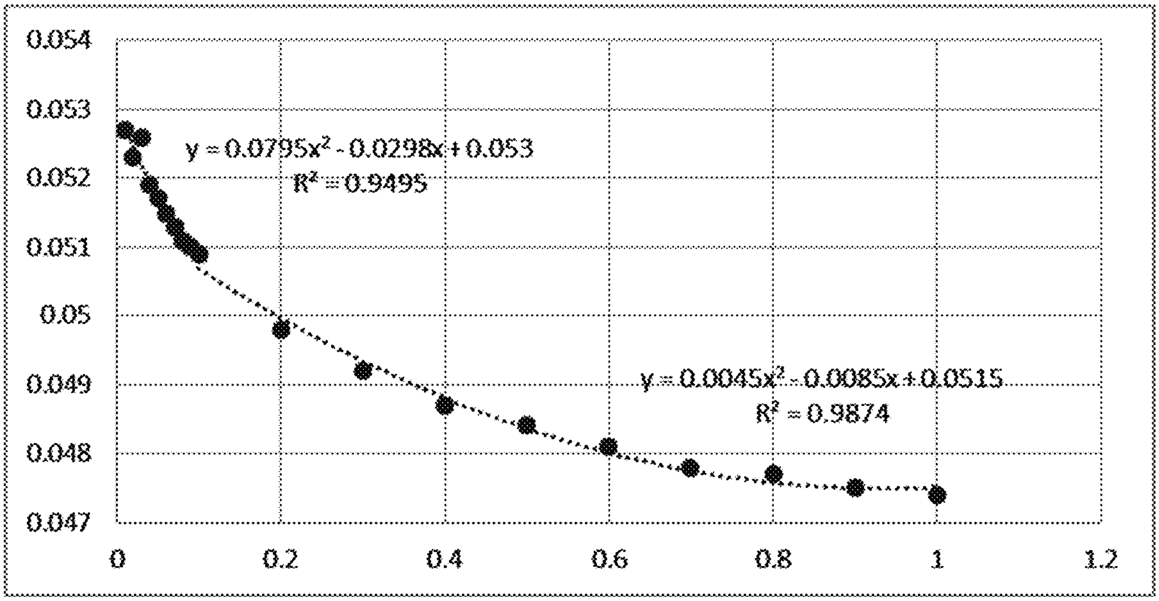
FIG. 5C is a schematic diagram of a y coordinate changing with a duty cycle in a chromaticity coordinate of channel B provided by one embodiment of the present application.

Taking RGB bulb lamps as an example, the chromaticity coordinate (including x coordinate and y coordinate) and the luminous flux of the R channel are shown in FIGS. 3A-3C, the chromaticity coordinate (including x coordinate and y coordinate) and the luminous flux of the G channel are shown in FIGS. 4A-4C, and the chromaticity coordinate (including x coordinate and y coordinate) and the luminous flux of the B channel are shown in FIGS. 5A-5C.

After a one-time calibration duty cycle based on the luminous flux, the color tolerance between the target chromaticity coordinate and the measured chromaticity coordinate is shown in Table 1. It can be seen that under a one-time duty cycle calibration, the maximum color tolerance of 20 color points is 5.1, and the average color tolerance is 4.2.

After secondary calibration of the duty cycle based on the chromaticity coordinate, the color tolerance between the target chromaticity coordinate and the measured chromaticity coordinate is shown in Table 2. It can be seen that under secondary duty cycle calibration, the maximum color tolerance for 20 color points is 1.5, and the average color tolerance is 1.4.

TABLE 1

| target chromaticity coordinate | | one-time calibration duty cycle | | | actual measured color coordinate | | color tolerance |
|---|---|---|---|---|---|---|---|
| x | y | R | G | B | x | y | SDCM |
| 0.3221 | 0.3317 | 100.00% | 62.71% | 20.17% | 0.3263 | 0.3384 | 3.4 |
| 0.41 | 0.51 | 100.00% | 72.14% | 1.24% | 0.4154 | 0.5123 | 4.1 |
| 0.45 | 0.47 | 100.00% | 44.10% | 1.43% | 0.4573 | 0.4754 | 5.1 |

TABLE 2

| target chromaticity coordinate | | secondary calibration of the duty cycle | | | actual measured color coordinate | | color tolerance |
|---|---|---|---|---|---|---|---|
| x | y | R | G | B | x | y | SDCM |
| 0.3221 | 0.3317 | 100.00% | 62.63% | 21.68% | 0.3202 | 0.3306 | 1.4 |
| 0.41 | 0.51 | 100.00% | 73.09% | 1.58% | 0.4117 | 0.5093 | 1.5 |
| 0.45 | 0.47 | 100.00% | 45.71% | 1.97% | 0.4488 | 0.4713 | 1.3 |

Embodiments of the present application, by determining a first expression formula of a chromaticity coordinate, a luminous flux and an input duty cycle of each path of three paths of a RGB color light source; calibrating, based on the first expression formula and tristimulus values of the three paths of the RGB color light source under a full current operation, a nonlinear transformation of the luminous flux, to obtain a first duty cycle value of the each path of the three paths of the RGB color light source, the first duty cycle value being obtained in consideration of the luminous flux variable with different duty cycle values; calibrating, based on the first duty cycle value and the first expression formula, a nonlinear transformation of the chromaticity coordinate, to obtain a second duty cycle value of the each path of the three paths of the RGB color light source, the second duty cycle value being obtained in consideration of the luminous flux and the chromaticity coordinate variable with the different duty cycle values; and controlling displaying colors of the RGB color light source based on the second duty cycle; which enables calibration calculation of the nonlinear transformation of the chromaticity coordinate and the luminous flux, effectively increase the accuracy of the color calculation, and the calculation method is simple.

It should be understood that the size of the sequence numbers of each step in the above embodiments does not imply the order of execution. The execution order of each process should be determined by its function and internal logic, and should not constitute any limitation on the implementation process of the embodiments of the present application.

The following are embodiments of the present application. For details not described in detail, the corresponding method embodiments can be referred to above.

Figure 6:
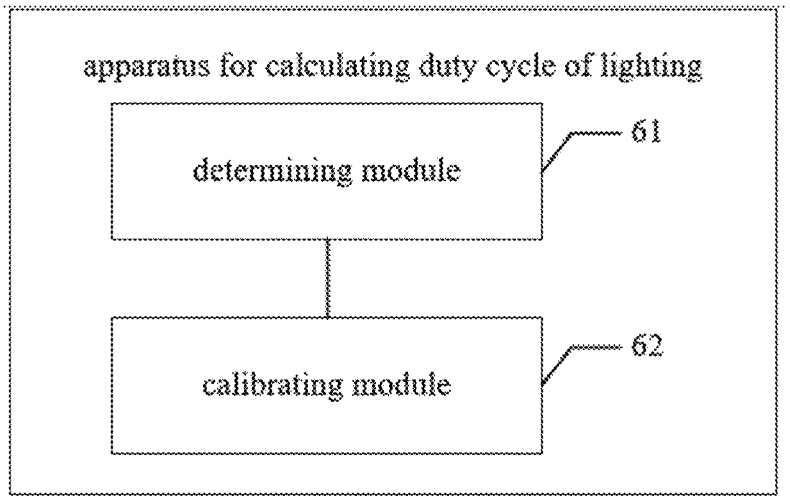
FIG. 6 is a schematic diagram of an apparatus for calculating a duty cycle of a lighting provided by one embodiment of the present application.

FIG. 6 shows a schematic diagram of the structure of an apparatus for calculating a duty cycle of a lighting provided in the embodiment of the present application. For ease of explanation, only the relevant parts of the embodiment of the present application are shown, as detailed below:

As shown in FIG. 6, the apparatus for calculating a duty cycle of a lighting includes a determining module 61 and a calibrating module 62.

A determining module 61 is configured to determine a first expression formula of a chromaticity coordinate, a luminous flux and an input duty cycle of each path of three paths of a RGB color light source.

A calibrating module 62 is configured to calibrate, based on the first expression formula and tristimulus values of the three paths of the RGB color light source under a full current operation, a nonlinear transformation of the luminous flux, to obtain a first duty cycle value of the each path of the three paths of the RGB color light source, the first duty cycle value being obtained in consideration of the luminous flux variable with different duty cycle values.

The calibrating module 62 further is configured to calibrate, based on the first duty cycle value and the first expression formula, a nonlinear transformation of the chromaticity coordinate, to obtain a second duty cycle value of the each path of the three paths of the RGB color light source, the second duty cycle value being obtained in consideration of the luminous flux and the chromaticity coordinate variable with the different duty cycle values; and control displaying colors of the RGB color light source based on the second duty cycle.

In one embodiment, after calibrating, based on the first duty cycle value and the first expression formula, the nonlinear transformation of the chromaticity coordinate, to obtain the second duty cycle value, the calibrating module 62 further is configured to determine, based on the second duty cycle value, a normalized duty cycle as a target duty cycle; and control displaying colors of the RGB color light source based on the target duty cycle.

In one embodiment, according to calibrate, based on the first expression formula and the tristimulus values of the three paths of the RGB color light source under the full current operation, the nonlinear transformation of the luminous flux, to obtain the first duty cycle value, the calibrating module 62 is specifically configured to: determine a second expression formula of the chromaticity coordinate and the luminous flux of a three-path mixed light of the RGB color light source; obtain a three-channel duty cycle formula based on the second expression formula and a sum of the tristimulus values under the full current operation of the three paths of the RGB color light source; obtain a first influencing parameter, based on the luminous flux under a full duty cycle of the three paths of the RGB color light source and the first duty cycle value to be determined; and obtaining the first duty cycle value based on the first influencing parameter, the three-channel duty cycle formula and a luminous flux expression of the first expression formula.

In one embodiment, the second expression formula is $$\begin{cases} Y = \eta_1 Y_1 + \eta_2 Y_2 + \eta_3 Y_3 \\ x = \dfrac{X}{X+Y+Z} = \dfrac{\eta_1 C_1 x_1 + \eta_2 C_2 x_2 + \eta_3 C_3 x_3}{\eta_1 C_1 + \eta_2 C_2 + \eta_3 C_3} \\ y = \dfrac{Y}{X+Y+Z} = \dfrac{\eta_1 C_1 y_1 + \eta_2 C_2 y_2 + \eta_3 C_3 y_3}{\eta_1 C_1 + \eta_2 C_2 + \eta_3 C_3} \end{cases}.$$

Where, x and y represent a horizontal coordinate and a vertical coordinate of the chromaticity coordinate of a target color, respectively; X, Y and Z represent three stimulation values of the tristimulus values of the RGB color light source, respectively; $Y_i$ represents the stimulation value Y under a full current operation of an ith path of the three paths of the RGB color light source, and i=(1, 2,3); the stimulation value Y is equal to the luminous flux Y; $\eta_i$ represents a duty cycle corresponding to the ith path of the three paths of the RGB color light source; $C_i$ represents a sum of the tristimulus values under the full current operation of the ith path of the three paths of the RGB color light source, and $$C_i = \frac{Y_i}{y_i};$$

$x_i$ represents a horizontal coordinate value of the chromaticity coordinate of the ith path of the three paths of the RGB color light source; $y_i$ represents a vertical coordinate value of the chromaticity coordinate of the ith path of the three paths of the RGB color light source.

In one embodiment, the three-channel duty cycle formula is $$\begin{cases} \eta_1 = \left[\dfrac{(y_2-y_3)(x_3-x)+(y-y_3)(x_2-x_3)}{(y_2-y_3)(x_3-x_1)+(y_1-y_3)(x_2-x_3)}\right]\dfrac{y_1 Y}{y Y_1} \\ \eta_2 = \left[\dfrac{(y_3-y_1)(x_1-x)+(y-y_1)(x_3-x_1)}{(y_3-y_1)(x_1-x_2)+(y_2-y_1)(x_3-x_1)}\right]\dfrac{y_2 Y}{y Y_2} \\ \eta_3 = \left[\dfrac{(y_2-y_1)(x_1-x)+(y-y_1)(x_2-x_1)}{(y_2-y_1)(x_1-x_3)+(y_3-y_1)(x_2-x_1)}\right]\dfrac{y_3 Y}{y Y_3} \end{cases}.$$

In one embodiment, according to obtain the first influencing parameter, based on the luminous flux under the full duty cycle of the three paths of the RGB color light source and the first duty cycle value to be determined, the calibrating module 62 is specifically configured to: obtain the first influencing parameter based on $S_i=Y_i*\eta_i'$.

Where, $S_i$ represents the first influencing parameter; $Y_i$ represents the stimulation value Y under the full current operation of the ith path of the three paths of the RGB color light source; $\eta_i'$ represents the first cycle value to be determined.

In one embodiment, according to obtain the first duty cycle value based on the first influencing parameter, the three-channel duty cycle formula and the luminous flux expression of the first expression formula, the calibrating module 62 is specifically configured to: replace the first influencing parameter with the luminous flux expression of the first expression formula, and substituting the luminous flux expression of the first expression formula into the three-channel duty cycle formula, to obtain a transformed luminous flux expression being $$\begin{cases} A_{Y_1}\eta_1'^2 + B_{Y_1}\eta_1' + C_{Y_1} = \left[\frac{(y_2-y_3)(x_3-x)+(y-y_3)(x_2-x_3)}{(y_2-y_3)(x_3-x_1)+(y_1-y_3)(x_2-x_3)}\right]\frac{y_1 Y}{y} \\ A_{Y_2}\eta_2'^2 + B_{Y_2}\eta_2' + C_{Y_2} = \left[\frac{(y_3-y_1)(x_1-x)+(y-y_1)(x_3-x_1)}{(y_3-y_1)(x_1-x_2)+(y_2-y_1)(x_3-x_1)}\right]\frac{y_2 Y}{y} \\ A_{Y_3}\eta_3'^2 + B_{Y_3}\eta_3' + C_{Y_3} = \left[\frac{(y_2-y_1)(x_1-x)+(y-y_1)(x_2-x_1)}{(y_2-y_1)(x_1-x_3)+(y_3-y_1)(x_2-x_1)}\right]\frac{y_3 Y}{y} \end{cases};$$

solve the transformed luminous flux expression to obtain $$\eta_i' = \frac{-B_{Y_i} + \sqrt{B_{Y_i}^2 - 4A_{Y_i}C_{Y_i}'}}{2A_{Yi}};$$

and take a positive solution of $\eta_i'$ as the first duty cycle value; where, $A_{Y_i}$, $B_{Y_i}$, and $C_{Y_i}$ represent three coefficients of the luminous flux of the ith path in the transformed luminous flux expression, respectively; $C'_{Y_i}$ represents another coefficient of the luminous flux of the ith path in the transformed luminous flux expression.

In one embodiment, after solving the transformed luminous flux expression to obtain $\eta_i'$, the calibrating module 62 further is configured to: after performing a segmented fitting treatment of the input duty cycle on the first expression formula to obtain a solution $\eta_i'$ corresponding to a low duty cycle and a solution $\eta_i'$ corresponding to a high duty cycle, when a positive solution of the solution $\eta_i'$ corresponding to the low duty cycle within a preset low duty cycle range, determine the positive solution of the solution $\eta_i'$ corresponding to the low duty cycle as the first duty cycle value; and when a positive solution of the solution $\eta_i'$ corresponding to the high duty cycle within a preset high duty cycle range, determine the positive solution of the solution $\eta_i'$ corresponding to the high duty cycle as the first duty cycle value.

In one embodiment, according to calibrate, based on the first duty cycle value and the first expression formula, the nonlinear transformation of the chromaticity coordinate, to obtain the second duty cycle value, the calibrating module 62 is specifically configured to: input the first duty cycle value into a chromaticity coordinate expression of the first expression formula, to obtain a calibration chromaticity coordinate corresponding to the each path of the RGB color light source under one calibration duty cycle; and input the calibration chromaticity coordinate into the transformed luminous flux expression, to obtain the second duty cycle value.

In one embodiment, according to determine, based on the second duty cycle value, the normalized duty cycle as the target duty cycle, the calibrating module 62 is specifically configured to: determine three luminous fluxes under the full duty cycle of the three paths of the RGB color light source, based on the first expression formula; determine a maximum duty cycle of three second duty cycle values corresponding to the three paths of the RGB color light source; determine a normalized luminous flux, based on the maximum duty cycle and the luminous flux of one path corresponding to the maximum duty cycle under the full duty cycle; and input the normalized luminous flux into the transformed luminous flux expression, and solve the transformed luminous flux expression, to obtain the target duty cycle.

In the apparatus for calculating the duty cycle of the lighting, the determining module 61 is configured to determine a first expression formula of a chromaticity coordinate, a luminous flux and an input duty cycle of each path of three paths of a RGB color light source; the calibrating module 62 is configured to calibrate, based on the first expression formula and tristimulus values of the three paths of the RGB color light source under a full current operation, to obtain a first duty cycle value of the each path of the three paths of the RGB color light source, the first duty cycle value being obtained in consideration of the luminous flux variable with different duty cycle values; and calibrate, based on the first duty cycle value and the first expression formula, a nonlinear transformation of the chromaticity coordinate, to obtain a second duty cycle value of the each path of the three paths of the RGB color light source, the second duty cycle value being obtained in consideration of the luminous flux and the chromaticity coordinate variable with the different duty cycle values; and control displaying colors of the RGB color light source based on the second duty cycle. Therefore, the apparatus can enable calibration calculation of the nonlinear transformation of the chromaticity coordinate and the luminous flux, effectively increase the accuracy of the color calculation, and the calculation method is simple.

An embodiment of the present application provides a system for calculating the lighting duty cycle, as shown in FIG. 7, including an apparatus 6 for calculating the lighting duty cycle, a command input module 71, an LED driving module 72, an LED light source module 73, and a storage module 74.

The command input module 71 is configured to input a command.

The LED light source module 73 includes a R light source, a G light source and a B light source.

The LED driving module 72 is configured to generate at least two PWM signals and output the at least two PWM signals to the LED light source module 73 for controlling the LED light source, where the PWM signal may be adjusted to a depth range of 0.1% or less.

The apparatus 6 for calculating the lighting duty cycle is configured to retrieve information from the storage module 75 based on the command input module 71, and calculate the PWM signal that the LED driving module 72 needs to output.

Figure 8:
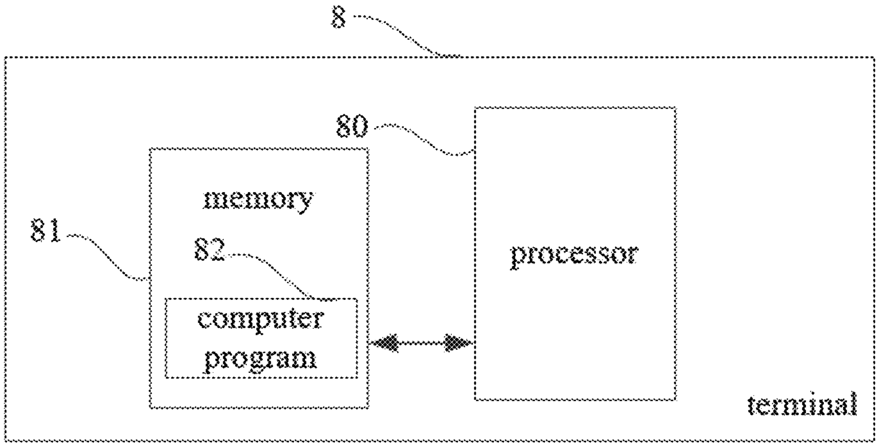
FIG. 8 is a schematic diagram of a terminal provided by one embodiment of the present application.

The apparatus 6 for calculating the duty cycle of the lighting may be a terminal. FIG. 8 is a schematic diagram of a terminal provided in an embodiment of the present application. As shown in FIG. 8, the terminal 8 of this embodiment includes: a processor 80, a memory 81, and a computer program 82 stored in the memory 81 that may run on the processor 80. When the processor 80 executes the computer program 82, the steps in the embodiments of the method for calculating the lighting duty cycle described above are implemented, such as steps 101 to 103 shown in FIG. 1. Alternatively, when the processor 80 executes the computer program 82, it implements the functions of each module/unit in the above apparatus embodiments, such as the functions of each module/unit shown in FIG. 6.

For example, the computer program 82 may be divided into one or more modules/units, which are stored in the memory 81 and executed by the processor 80 to complete the present application. One or more modules/units may be a series of computer program instruction segments capable of performing specific functions, which are used to describe the execution process of the computer program 82 in terminal 8. For example, the computer program 82 may be divided into modules/units as shown in FIG. 6.

The terminal 8 may include, but is not limited to, the processor 80 and the memory 81. Technicians in this field can understand that FIG. 8 is only an example of the terminal 8 and does not constitute a limitation on the terminal 8. It may include more or fewer components than illustrated, or combinations of certain components, or different components. For example, the terminal 8 may also include input/output devices, network access devices, buses, etc.

The processor 80 may be a central processing unit (CPU), other general-purpose processor, digital signal processor (DSP), application specific integrated circuit (ASIC), field programmable gate array (FPGA), or other programmable logic device, discrete gate, or transistor logic device, discrete hardware component, etc. A general-purpose processor may be a microprocessor or any conventional processor.

The memory 81 may be an internal storage unit of the terminal 8, such as the hard disk or memory of the terminal 8. The memory 81 may also be an external storage device of the terminal 8, such as a plug-in hard drive, smart media card (SMC), secure digital (SD) card, flash card, etc. equipped on the terminal 8. Furthermore, the memory 81 may also include both internal storage units of the terminal 8 and external storage devices. The memory 81 is used to store computer programs and other programs and data required by the terminal 8. The memory 81 may also be used to temporarily store data that has already been or will be output.

Technicians in the field can clearly understand that, for the convenience and conciseness of description, only the division of various functional units and modules mentioned above is given as an example. In practical applications, the above functions can be assigned to different functional units and modules as needed, that is, the internal structure of the device can be divided into different functional units or modules to complete all or part of the functions described above. The various functional units and modules in the implementation example can be integrated into one processing unit, or they can exist separately physically, or two or more units can be integrated into one unit. The integrated units mentioned above can be implemented in the form of hardware or software functional units. In addition, the specific names of each functional unit and module are only for the purpose of distinguishing them from each other and are not used to limit the scope of protection of the present application. The specific working process of the units and modules in the above system can refer to the corresponding process in the aforementioned method implementation examples, and will not be repeated here.

In the above embodiments, the descriptions of each embodiment have their own emphasis. For parts that are not detailed or recorded in one embodiment, please refer to the relevant descriptions of other embodiments.

Ordinary technical personnel in this field can realize that the units and algorithm steps of each example described in the disclosed embodiments may be implemented in electronic hardware, or a combination of computer software and electronic hardware. Whether these functions are executed in hardware or software depends on the specific application and design constraints of the technical solution. Professional technicians may use different methods to achieve the described functions for each specific application, but such implementation should not be considered beyond the scope of the present application.

In the embodiments provided by the present application, it should be understood that the disclosed devices/terminals and methods may be implemented in other ways. For example, the device/terminal embodiments described above are only illustrative. For example, the division of modules or units is only a logical function division. In actual implementation, there may be other division methods, such as multiple units or components may be combined or integrated into another system, or some features may be ignored or not executed. Another point is that the coupling or direct coupling or communication connection displayed or discussed between each other may be indirect coupling or communication connection through some interfaces, devices or units, which may be in the form of electrical, mechanical or other forms.

The unit used as a separate component description may be or may not be physically separated, and the component displayed as a unit can be or may not be a physical unit, which may be located in one place or distributed across multiple network units. Some or all units may be selected according to actual needs to achieve the purpose of this embodiment.

In addition, in various embodiments of the present application, each functional unit may be integrated into one processing unit, each unit may physically exist separately, or two or more units may be integrated into one unit. The integrated units mentioned above may be implemented in both hardware and software functional units.

Integrated modules/units, if implemented in the form of software functional units and sold or used as independent products, may be stored in a non-transitory computer-readable storage medium. Based on this understanding, the present application implements all or part of the processes in the above-mentioned embodiments, and may also be completed by instructing relevant hardware through computer programs. The computer programs may be stored in a non-transitory computer-readable storage medium, and when executed by the processor, the steps of the various embodiments of the method for planning the equipment capacity of the integrated energy station may be implemented. Where, computer programs include computer program code, which may be in the form of source code, object code, executable files, or some intermediate form. The non-transitory computer readable storage medium may include any entity or device capable of carrying computer program code, recording media, USB drive, portable hard drive, magnetic disk, optical disk, computer memory, read only memory (ROM), random access memory (RAM), electrical carrier signal, telecommunications signal, and software distribution media.

The above embodiments are only used to illustrate the technical solution of the present application, and not to limit it; although the present application has been described in detail with reference to the aforementioned embodiments, those skilled in the art should understand that they can still modify the technical solutions recorded in the aforementioned embodiments or equivalently replace some of the technical features thereof; and these modifications or replacements do not separate the essence of the corresponding technical solutions from the spirit and scope of the technical solutions of the various embodiments of the present application, and should be included in the scope of protection of the present application.

What is claimed is:

1. A method, comprising:

determining a first expression formula of a chromaticity coordinate, a luminous flux and an input duty cycle of each path of three paths of a RGB color light source;

calibrating, based on the first expression formula and tristimulus values of the three paths of the RGB color light source under a full current operation, a nonlinear transformation of the luminous flux, to obtain a first duty cycle value of the each path of the three paths of the RGB color light source, the first duty cycle value being obtained in consideration of the luminous flux variable with different duty cycle values;

calibrating, based on the first duty cycle value and the first expression formula, a nonlinear transformation of the chromaticity coordinate, to obtain a second duty cycle value of the each path of the three paths of the RGB color light source, the second duty cycle value being obtained in consideration of the luminous flux and the chromaticity coordinate variable with the different duty cycle values; and controlling displaying colors of the RGB color light source based on the second duty cycle value.

2. The method according to claim 1, wherein after calibrating, based on the first duty cycle value and the first expression formula, the nonlinear transformation of the chromaticity coordinate, the method further comprises:

determining, based on the second duty cycle value, a normalized duty cycle as a target duty cycle; and controlling displaying the colors of the RGB color light source based on the target duty cycle.

3. The method according to claim 2, wherein calibrating, based on the first expression formula and the tristimulus values of the three paths of the RGB color light source under the full current operation, the nonlinear transformation of the luminous flux, to obtain the first duty cycle value, comprises:

determining a second expression formula of the chromaticity coordinate and the luminous flux of a three-path mixed light of the RGB color light source;

obtaining a three-channel duty cycle formula based on the second expression formula and a sum of the tristimulus values, the three-channel duty cycle formula representing respective duty cycles of the three paths;

obtaining a first influencing parameter, based on the luminous flux under a full duty cycle of the three paths of the RGB color light source and the first duty cycle value to be determined; and obtaining the first duty cycle value based on the first influencing parameter, the three-channel duty cycle formula and a luminous flux expression of the first expression formula.

4. The method according to claim 3, wherein the second expression formula is $$\begin{cases} Y = \eta_1 Y_1 + \eta_2 Y_2 + \eta_3 Y_3 \\ x = \dfrac{X}{X+Y+Z} = \dfrac{\eta_1 C_1 x_1 + \eta_2 C_2 x_2 + \eta_3 C_3 x_3}{\eta_1 C_1 + \eta_2 C_2 + \eta_3 C_3} \\ y = \dfrac{Y}{X+Y+Z} = \dfrac{\eta_1 C_1 y_1 + \eta_2 C_2 y_2 + \eta_3 C_3 y_3}{\eta_1 C_1 + \eta_2 C_2 + \eta_3 C_3} \end{cases};$$

wherein, x and y represent a horizontal coordinate and a vertical coordinate of the chromaticity coordinate of a target color, respectively; X, Y and Z represent three stimulation values of the tristimulus values of the RGB color light source, respectively; $Y_i$ represents the stimulation value Y under a full current operation of an ith path of the three paths of the RGB color light source, and i=(1, 2,3); the stimulation value Y is equal to the luminous flux Y; $\eta_i$ represents a duty cycle corresponding to the ith path of the three paths of the RGB color light source; $C_i$ represents a sum of the tristimulus values under the full current operation of the ith path of the three paths of the RGB color light source, and $$C_i = \frac{Y_i}{y_i};$$

$x_i$ represents a horizontal coordinate value of the chromaticity coordinate of the ith path of the three paths of the RGB color light source; $y_i$ represents a vertical coordinate value of the chromaticity coordinate of the ith path of the three paths of the RGB color light source;

the three-channel duty cycle formula is $$\begin{cases} \eta_1 = \left[\dfrac{(y_2-y_3)(x_3-x)+(y-y_3)(x_2-x_3)}{(y_2-y_3)(x_3-x_1)+(y_1-y_3)(x_2-x_3)}\right]\dfrac{y_1 Y}{yY_1} \\ \eta_2 = \left[\dfrac{(y_3-y_1)(x_1-x)+(y-y_1)(x_3-x_1)}{(y_3-y_1)(x_1-x_2)+(y_2-y_1)(x_3-x_1)}\right]\dfrac{y_2 Y}{yY_2} \\ \eta_3 = \left[\dfrac{(y_2-y_1)(x_1-x)+(y-y_1)(x_2-x_1)}{(y_2-y_1)(x_1-x_3)+(y_3-y_1)(x_2-x_1)}\right]\dfrac{y_3 Y}{yY_3} \end{cases};$$

wherein, obtaining the first influencing parameter, based on the luminous flux under the full duty cycle of the three paths of the RGB color light source and the first duty cycle value to be determined comprises:

obtaining the first influencing parameter based on $S_i Y_i * \eta_i'$;

wherein, $S_i$ represents the first influencing parameter; $Y_i$ represents the stimulation value Y under the full current operation of the ith path of the three paths of the RGB color light source; $\eta_i'$ represents the first cycle value to be determined; and wherein, obtaining the first duty cycle value based on the first influencing parameter, the three-channel duty cycle formula and the luminous flux expression of the first expression formula, comprises:

replacing the first influencing parameter with the luminous flux expression of the first expression formula, and substituting the luminous flux expression of the first expression formula into the three-channel duty cycle formula, to obtain a transformed luminous flux expression being $$\begin{cases} A_{Y_1}\eta_1'^2 + B_{Y_1}\eta_1' + C_{Y_1} = \left[\dfrac{(y_2-y_3)(x_3-x)+(y-y_3)(x_2-x_3)}{(y_2-y_3)(x_3-x_1)+(y_1-y_3)(x_2-x_3)}\right]\dfrac{y_1 Y}{y} \\ A_{Y_2}\eta_2'^2 + B_{Y_2}\eta_2' + C_{Y_2} = \left[\dfrac{(y_3-y_1)(x_1-x)+(y-y_1)(x_3-x_1)}{(y_3-y_1)(x_1-x_2)+(y_2-y_1)(x_3-x_1)}\right]\dfrac{y_2 Y}{y} \\ A_{Y_3}\eta_3'^2 + B_{Y_3}\eta_3' + C_{Y_3} = \left[\dfrac{(y_2-y_1)(x_1-x)+(y-y_1)(x_2-x_1)}{(y_2-y_1)(x_1-x_3)+(y_3-y_1)(x_2-x_1)}\right]\dfrac{y_3 Y}{y} \end{cases};$$

solving the transformed luminous flux expression to obtain $$\eta_i' = \frac{-B_{Y_i} + \sqrt{B_{Y_i}^2 - 4A_{Y_i}C'_{Y_i}}}{2A_{Y_i}};$$

and taking a positive solution of $\eta_i'$ as the first duty cycle value; and wherein, $A_{Y_i}$, $B_{Y_i}$, and $C_{Y_i}$ represent three coefficients of the luminous flux of the ith path in the transformed luminous flux expression, respectively; $C'_{Y_i}$ represents another coefficient of the luminous flux of the ith path in the transformed luminous flux expression.

5. The method according to claim 4, further comprising:

performing a segmented fitting treatment of the input duty cycle on the first expression formula; and wherein after solving the transformed luminous flux expression to obtain $\eta_i'$, the method further comprises:

after performing the segmented fitting treatment of the input duty cycle on the first expression formula to obtain a solution $\eta_i'$ corresponding to a low duty cycle and a solution $\eta_i'$ corresponding to a high duty cycle, when a positive solution of the solution $\eta_i'$ corresponding to the low duty cycle is within a preset low duty cycle range, determining the positive solution of the solution $\eta_i'$ corresponding to the low duty cycle as the first duty cycle value; and when a positive solution of the solution $\eta_i'$ corresponding to the high duty cycle is within a preset high duty cycle range, determining the positive solution of the solution $\eta_i'$ corresponding to the high duty cycle as the first duty cycle value.

6. The method according to claim 4, wherein calibrating, based on the first duty cycle value and the first expression formula, the nonlinear transformation of the chromaticity coordinate, to obtain the second duty cycle value, comprises:

inputting the first duty cycle value into a chromaticity coordinate expression of the first expression formula, to obtain a calibration chromaticity coordinate corresponding to the each path of the RGB color light source under one calibration duty cycle; and inputting the calibration chromaticity coordinate into the transformed luminous flux expression, to obtain the second duty cycle value.

7. The method according to claim 4, wherein determining, based on the second duty cycle value, the normalized duty cycle as the target duty cycle, comprises:

determining three luminous fluxes under the full duty cycle of the three paths of the RGB color light source, based on the first expression formula;

determining a maximum duty cycle of three second duty cycle values corresponding to the three paths of the RGB color light source;

determining a normalized luminous flux, based on the maximum duty cycle and the luminous flux of one path corresponding to the maximum duty cycle under the full duty cycle; and inputting the normalized luminous flux into the transformed luminous flux expression, and solving the transformed luminous flux expression, to obtain the target duty cycle.

8. A terminal comprising a non-transitory memory and a processor, wherein the memory is configured to store a computer program, and the processor is configured to execute the computer program stored in the memory to perform the method according to claim 1.

9. A non-transitory computer-readable storage medium, the non-transitory computer-readable storage medium storing a computer program, wherein the computer program, when executed by a processor, causes a processor to perform the method according to claim 1.

10. An apparatus, comprising:

a non-transitory memory storing a computer program; and one or more processors in communication with the memory, wherein the computer program, when executed by the one or more processors, causes the apparatus to perform:

determining a first expression formula of a chromaticity coordinate, a luminous flux and an input duty cycle of each path of three paths of a RGB color light source;

calibrating, based on the first expression formula and tristimulus values of the three paths of the RGB color light source under a full current operation, a nonlinear transformation of the luminous flux, to obtain a first duty cycle value of the each path of the three paths of the RGB color light source, the first duty cycle value being obtained in consideration of the luminous flux variable with different duty cycle values;

calibrating, based on the first duty cycle value and the first expression formula, a nonlinear transformation of the chromaticity coordinate, to obtain a second duty cycle value of the each path of the three paths of the RGB color light source, the second duty cycle value being obtained in consideration of the luminous flux and the chromaticity coordinate variable with the different duty cycle values; and controlling displaying colors of the RGB color light source based on the second duty cycle value.

* * * * *